Figure 9:
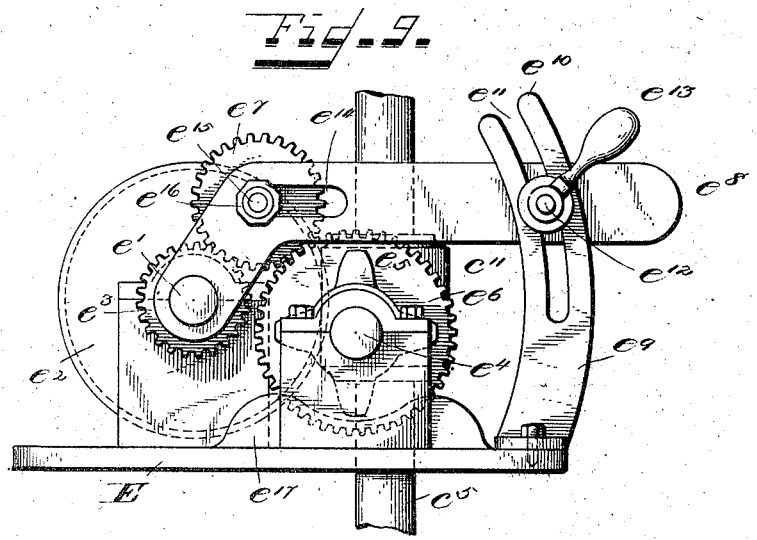

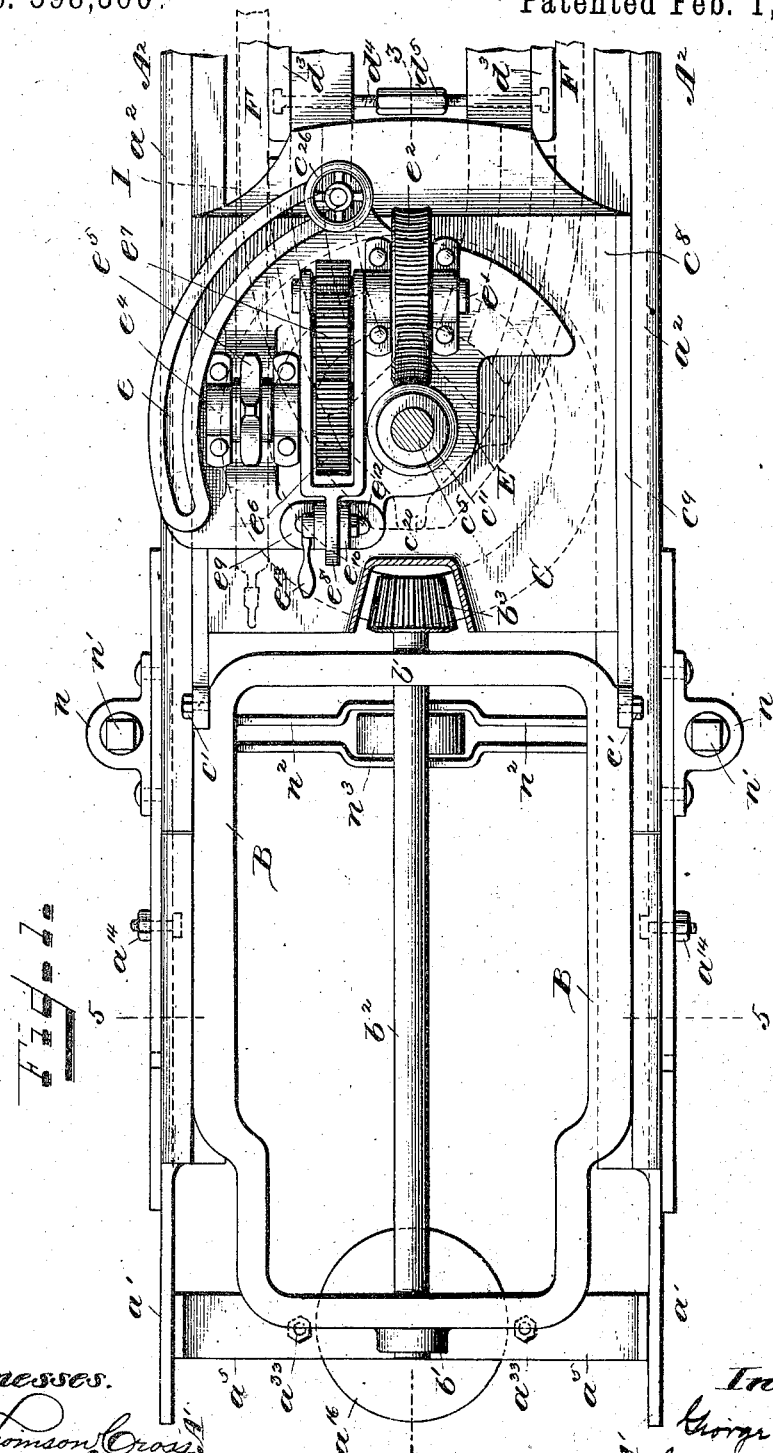

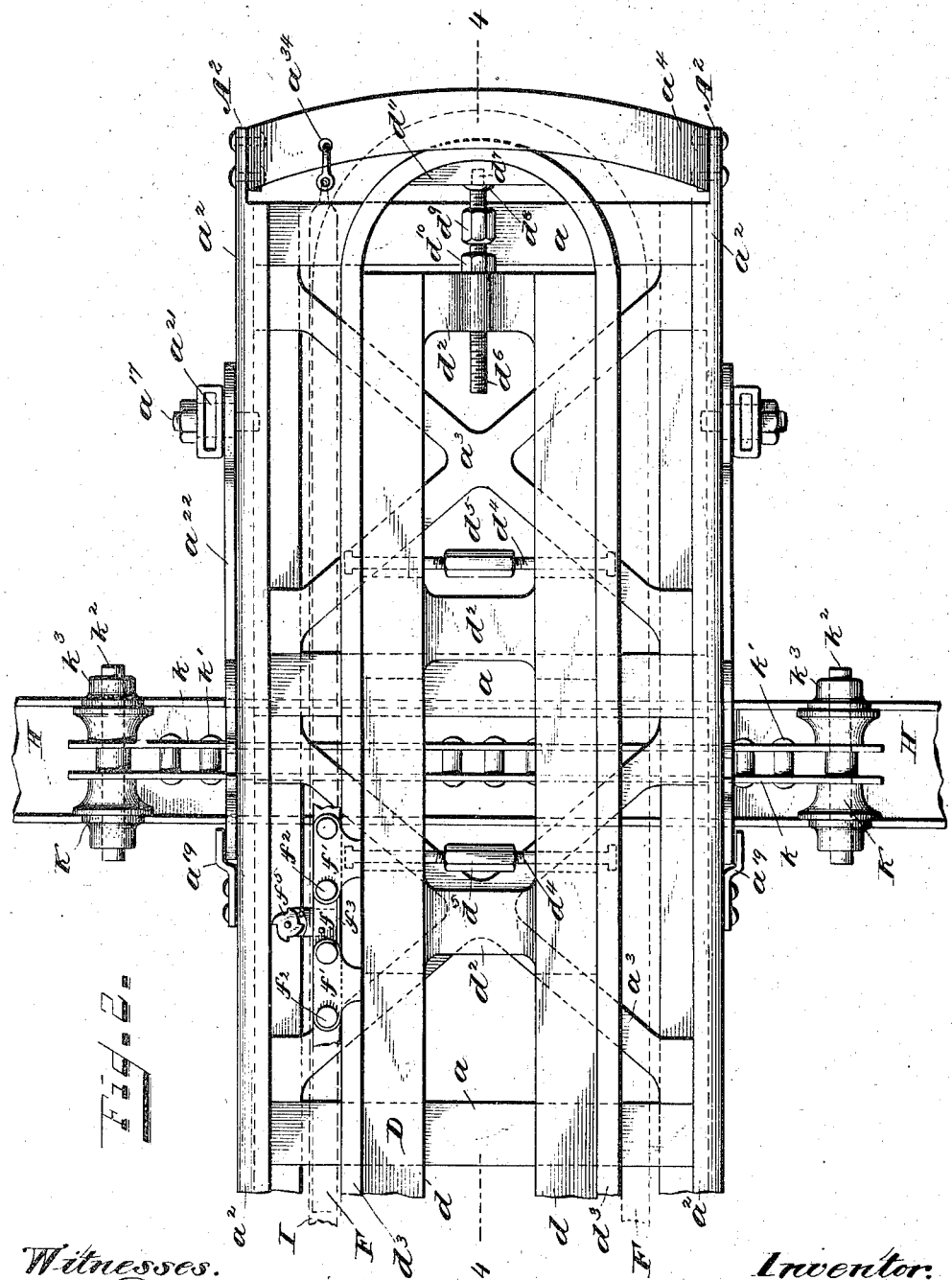

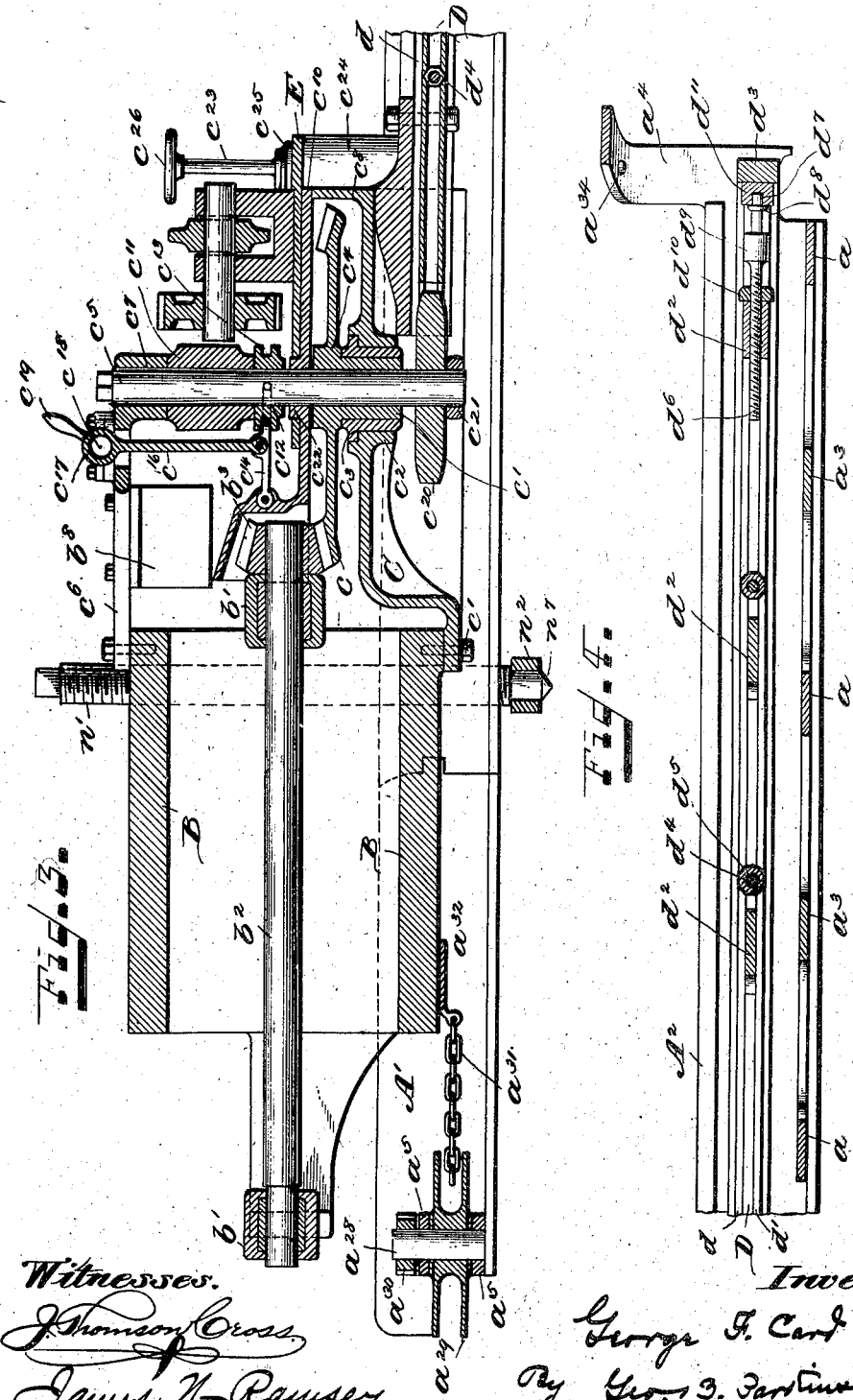

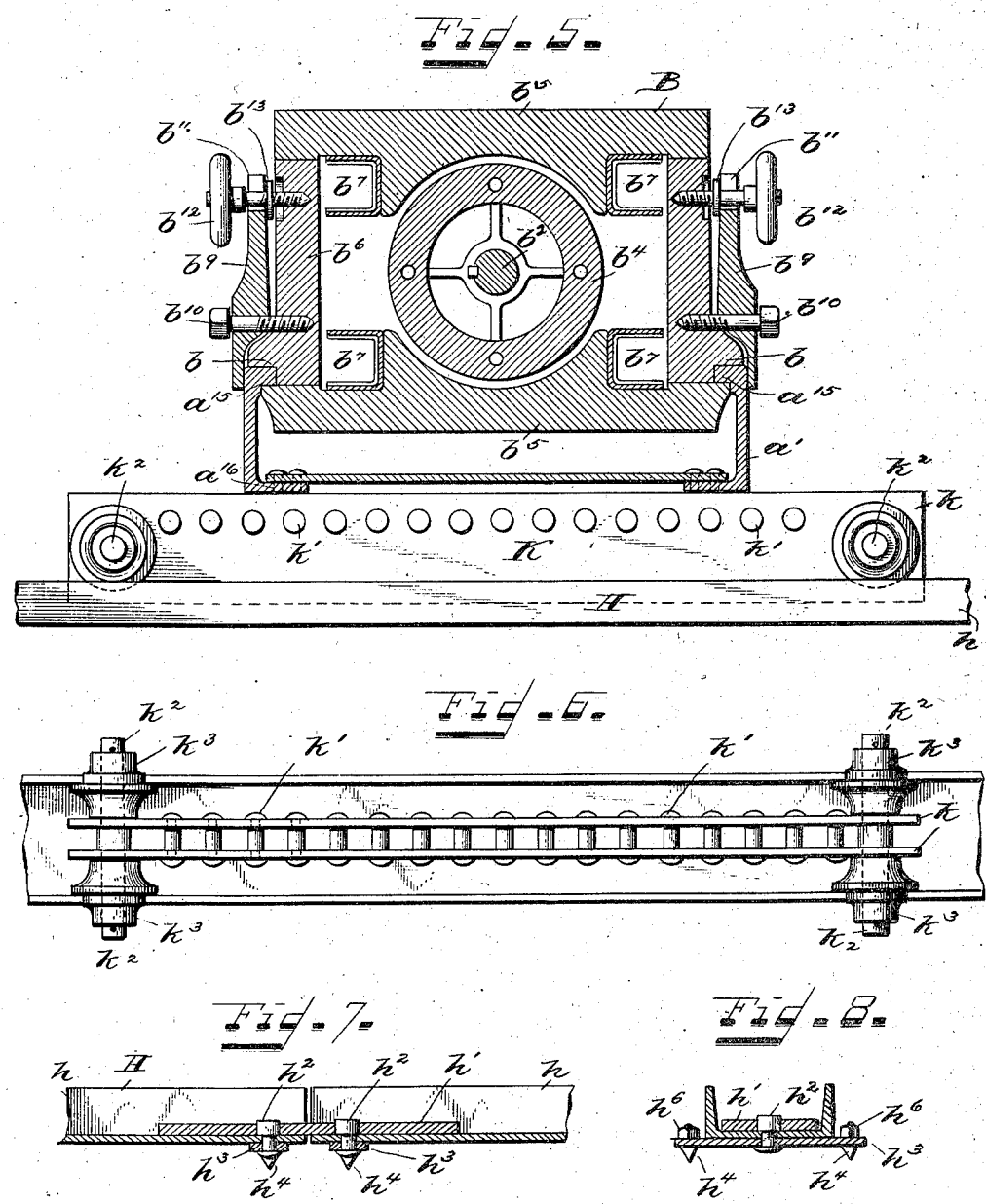

(No Model.)

G. F. CARD.
MINING MACHINERY.

No. 598,360.

12 Sheets—Sheet 5.

Patented Feb. 1, 1898.

Witnesses.
J. Thomson Cross
James N. Ramsey

Inventor:
George F. Card,
By Geo. B. Parkinson
His Attorney.

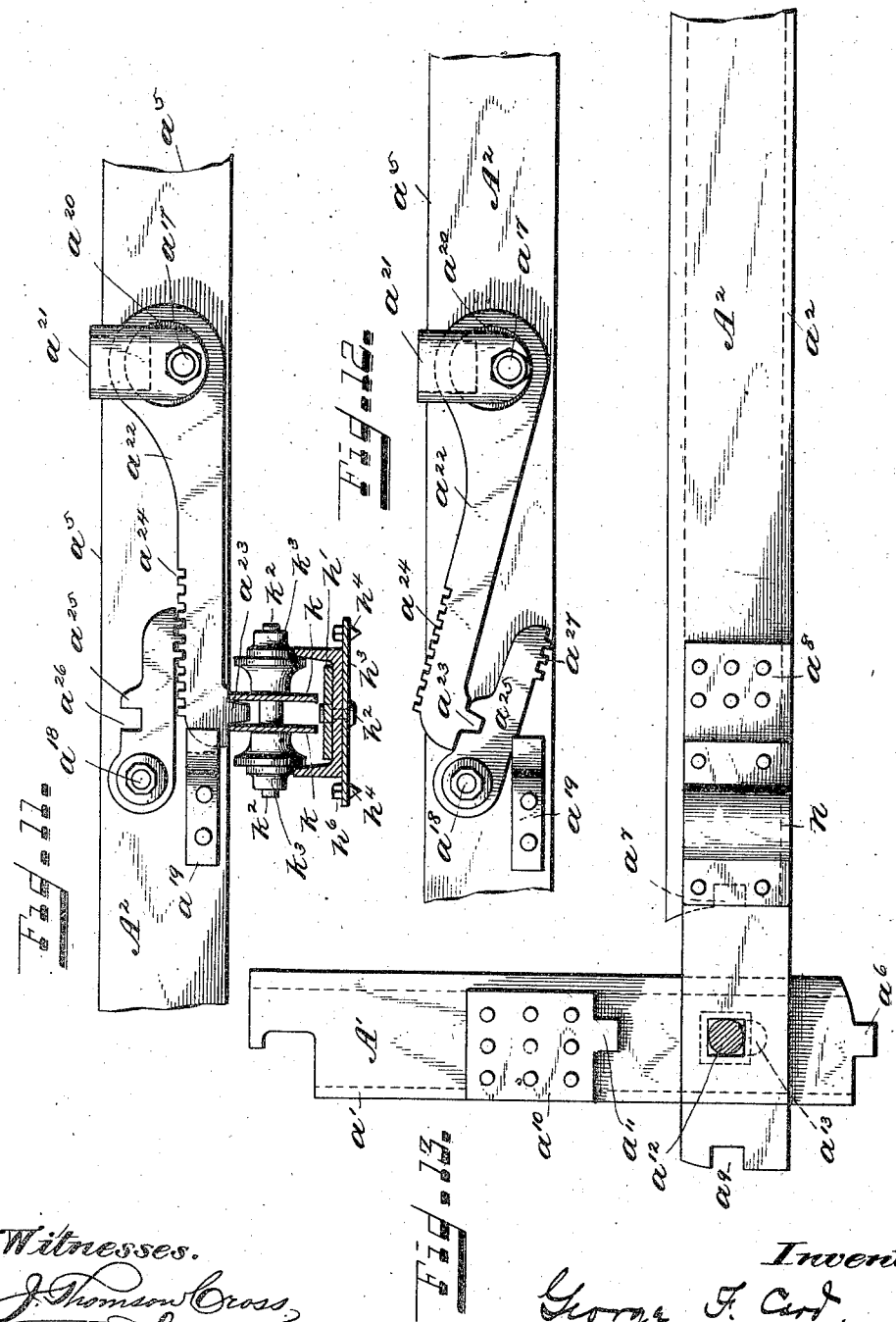

(No Model.)  
12 Sheets—Sheet 7.
G. F. CARD.
MINING MACHINERY.
No. 598,360. Patented Feb. 1, 1898.
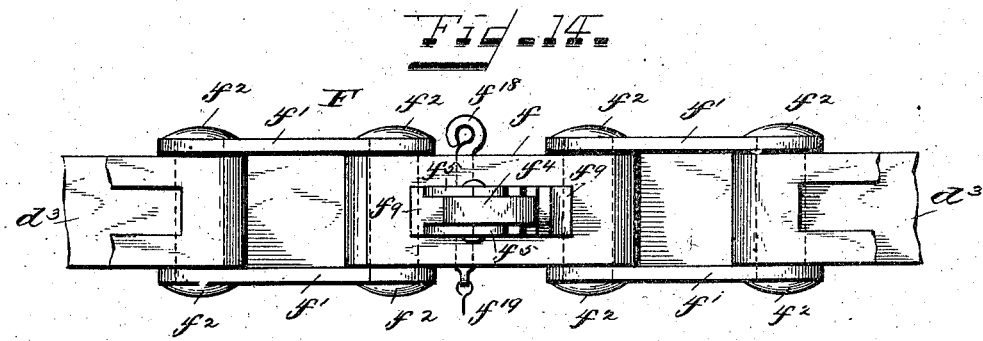
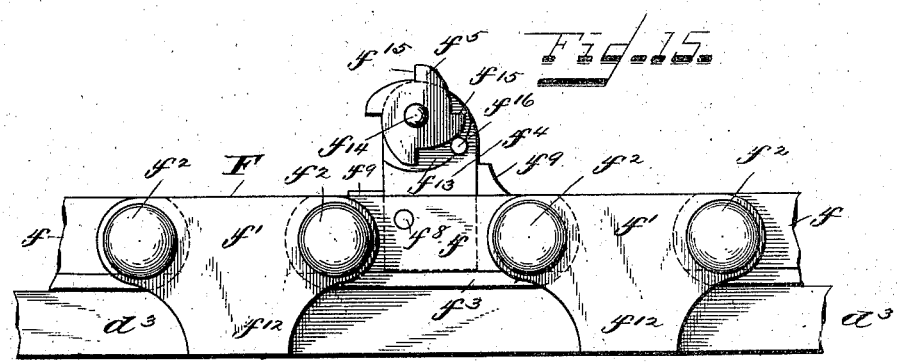
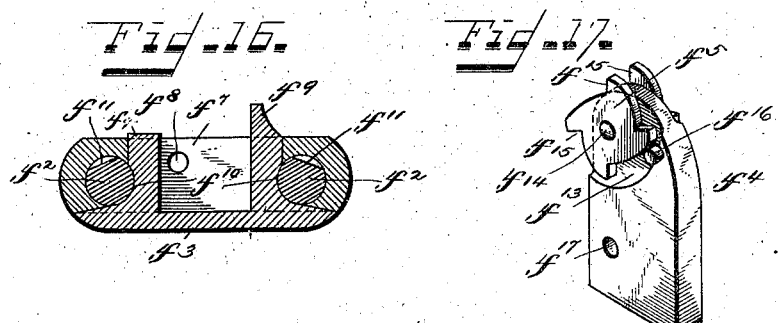
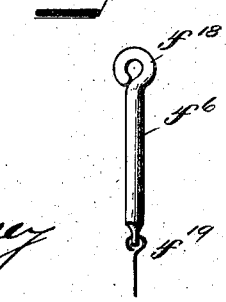
Witnesses.
J. Thomson Cross
James N. Ramsey
Inventor:
George F. Card
By Geo. B. Parkinson
His Attorney.

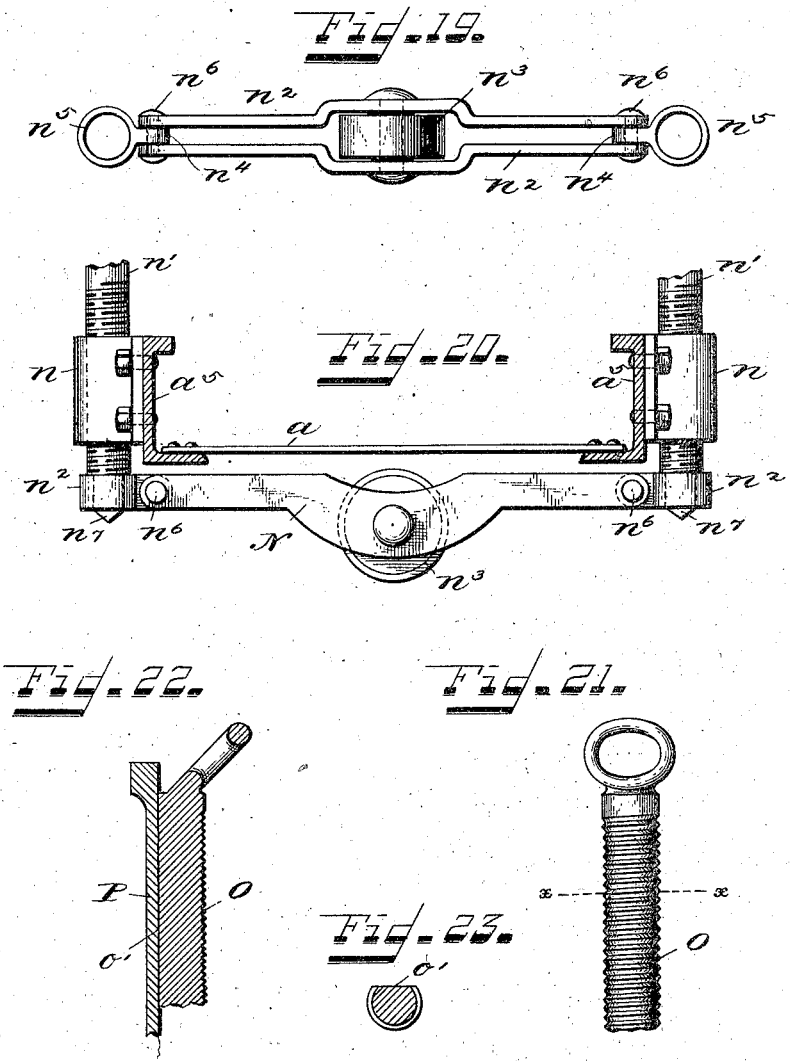

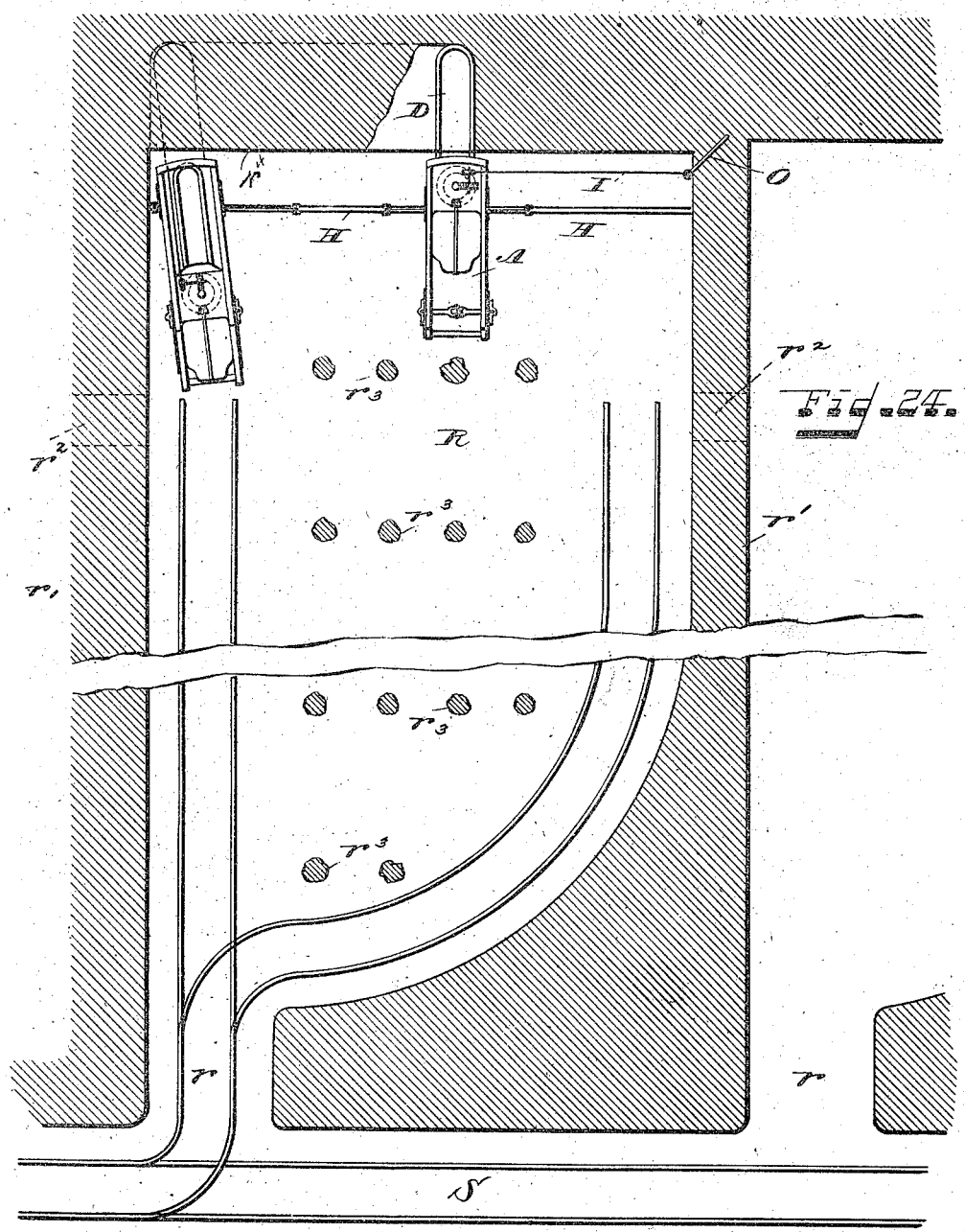

(No Model.) 12 Sheets—Sheet 10.
G. F. CARD.
MINING MACHINERY.
No. 598,360. Patented Feb. 1, 1898.
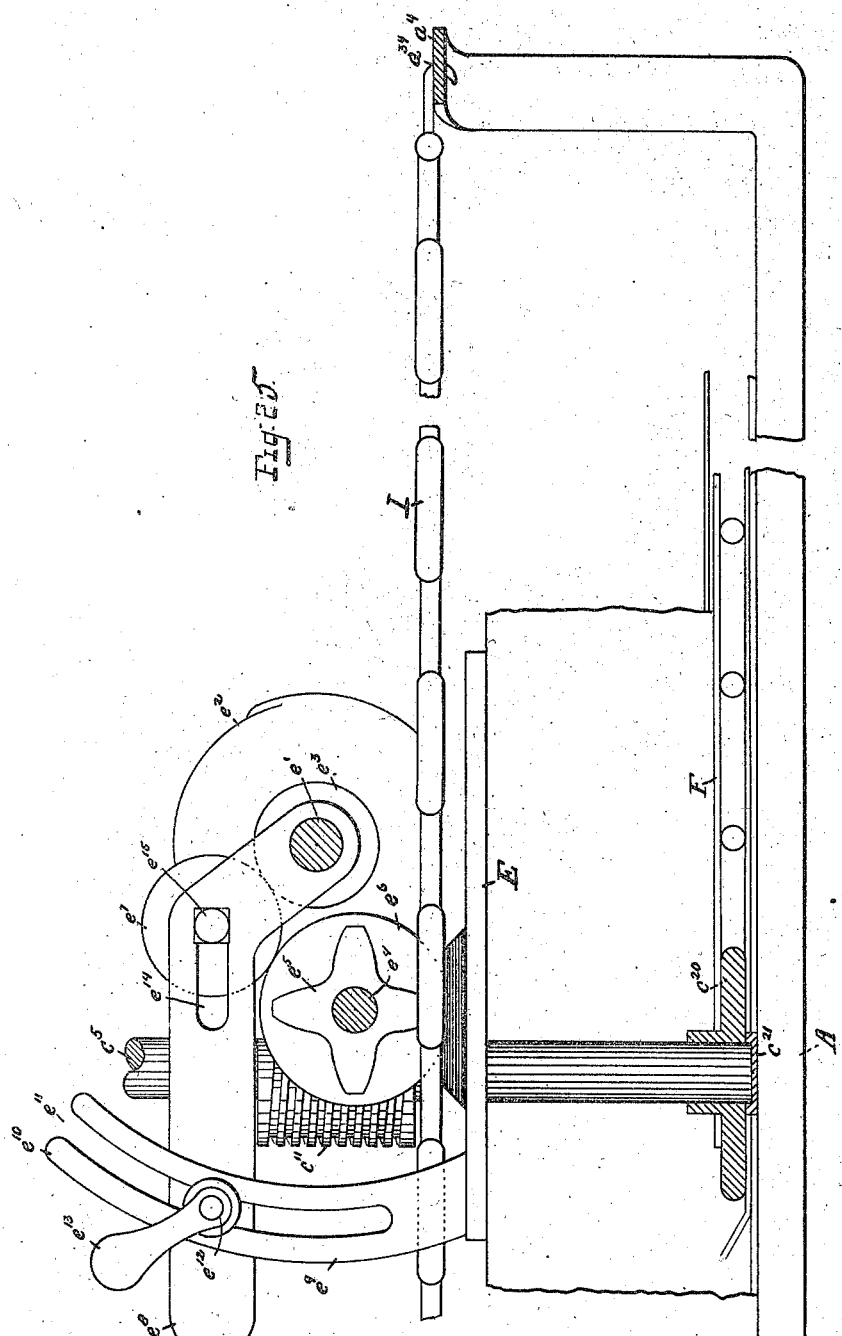
Witnesses
Brayton G. Richards
Thomas D. Curry
Inventor
George F. Card
By Attorney
Geo. B. Turkinson (No Model.)

G. F. CARD.
MINING MACHINERY.

No. 598,360.

12 Sheets—Sheet 11.

Patented Feb. 1, 1898.

Witnesses

Inventor
George F. Card,
By Attorney (No Model.)  12 Sheets—Sheet 12.

G. F. CARD.
MINING MACHINERY.

No. 598,360.  Patented Feb. 1, 1898.

Witnesses
Ernest K. Hood
Edwin H. Ketcham

Inventor
George F. Card,
By His Attorney,
Geo. B. Parkinson.

UNITED STATES PATENT OFFICE.

GEORGE F. CARD, OF COVINGTON, KENTUCKY.

MINING MACHINERY.

SPECIFICATION forming part of Letters Patent No. 598,360, dated February 1, 1898.

Application filed July 27, 1892. Serial No. 441,361. (No model.)

*To all whom it may concern:*

Be it known that I, GEORGE F. CARD, a citizen of the United States, residing in Covington, county of Kenton, State of Kentucky, have invented certain new and useful Improvements in Mining Machinery, of which the following is a specification.

The subject of this invention is an improved machine for mining or undercutting coal or other minerals; and the machine is designed more especially for operating on the "long-wall" or "continuous-face" system, wherein a horizontal cut is made at or near the lower edge of the vein and along the full length of the gallery, but may be advantageously employed in mines conducted on the more common "room-and-pillar" system.

The machine, broadly speaking, consists of a projecting cutting apparatus driven by a motor of any preferred type, suitably mounted on a sliding frame moved on a track along the face of the gallery, and knives or cutters fastened to the links of an endless chain, so driven in a horizontal plane that a continuous kerf is cut under the mineral near the lower part, whereby the overhanging mass may be more readily detached.

My invention consists in a construction and arrangement of parts whereby the advantages of end-cutting and side-cutting machines are united in a single machine; in the peculiar construction and adaptation of the parts constituting the cutting mechanism and the main frame, whereby the former is permitted to slide along the latter and the projecting cutter-arm to cut into the coal or other mineral in the line of the length of the machine and then to cut on a line at right angles thereto; in the construction and arrangement of the device for feeding or drawing the operating mechanism and the use of one feeding device for both longitudinal and side feeds; in the construction and arrangement of the mechanism for withdrawing the cutter-arm and cutter-carrying chain from the kerf at the close of or during a cut; in the construction and combination of the parts constituting the main frame; in means for shortening the ground length of the main frame without interfering with the operation of the cutting mechanism; in mechanism for adjusting the level of the machine and the combination therewith of means for steadying the machine during its movement along the track; in mechanism for clamping the frame carrying the operating mechanism to the main frame; in the construction of the cutter-links and the combination, with them, of detachable shoes and means for securing the two parts together; in removable cutting points or tools, a holder of special construction for the cutting-points, and means for securing the cutting-points to the holders; in the combination, with the cutter-arm and cutter-carrying chain, of a guide or shoe movable longitudinally relatively to the cutter-arm and means for adjusting its position; in a track of novel construction consisting of rails or guides with removable points on the lower part extending downward to prevent slipping on the floor and means for connecting two or more sections together; in a separate carriage or truck for supporting and guiding the machine on the track across the room or gallery during the operation of cutting; in the combination, with the main frame, of a device for securing the latter to the carriage or truck and means for throwing the main frame to an angle with the track in a manner and for a purpose hereinafter more fully described; in means for fastening the feed or drawing chain to the wall of the gallery.

Figure 10:
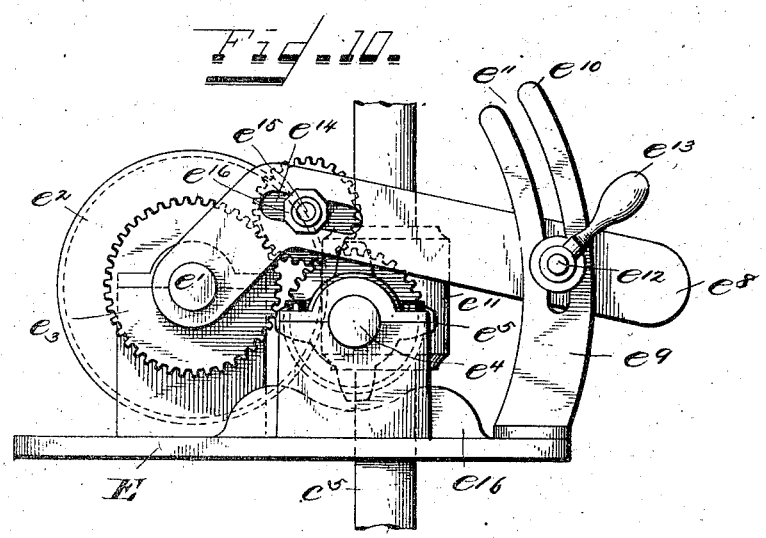
Figure 26:
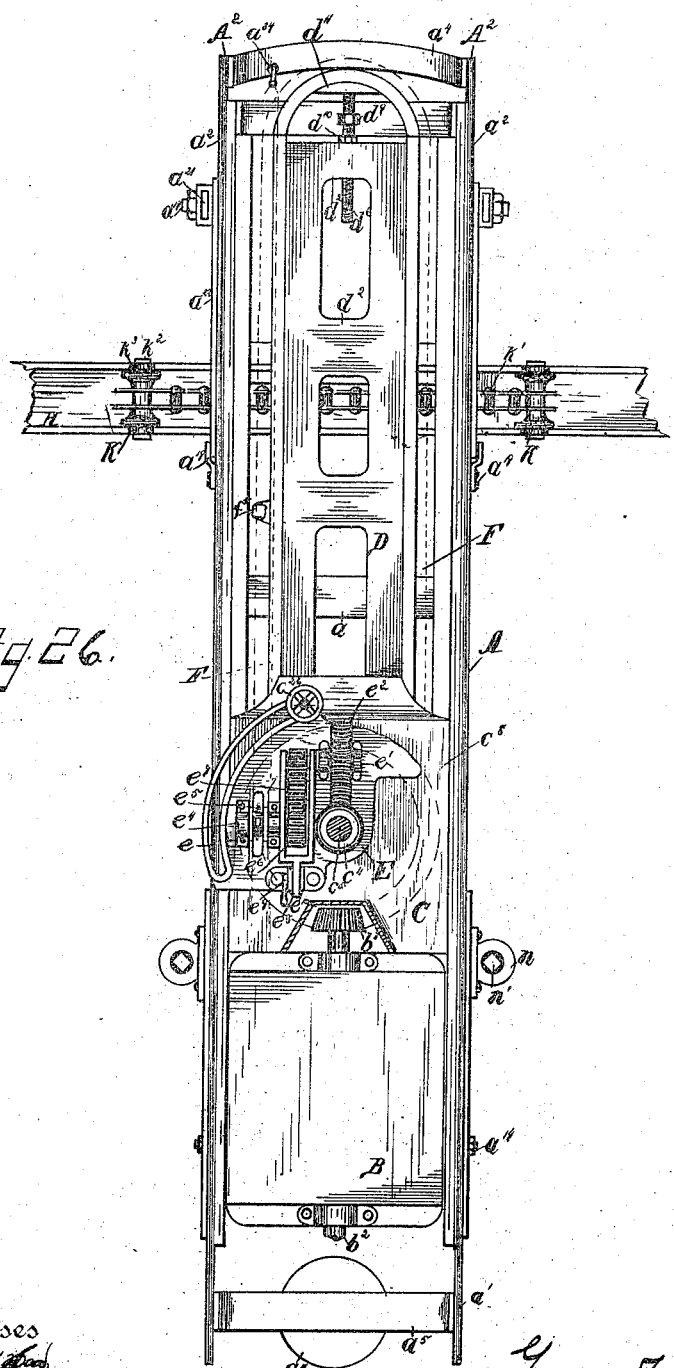
Figures 27, 28:
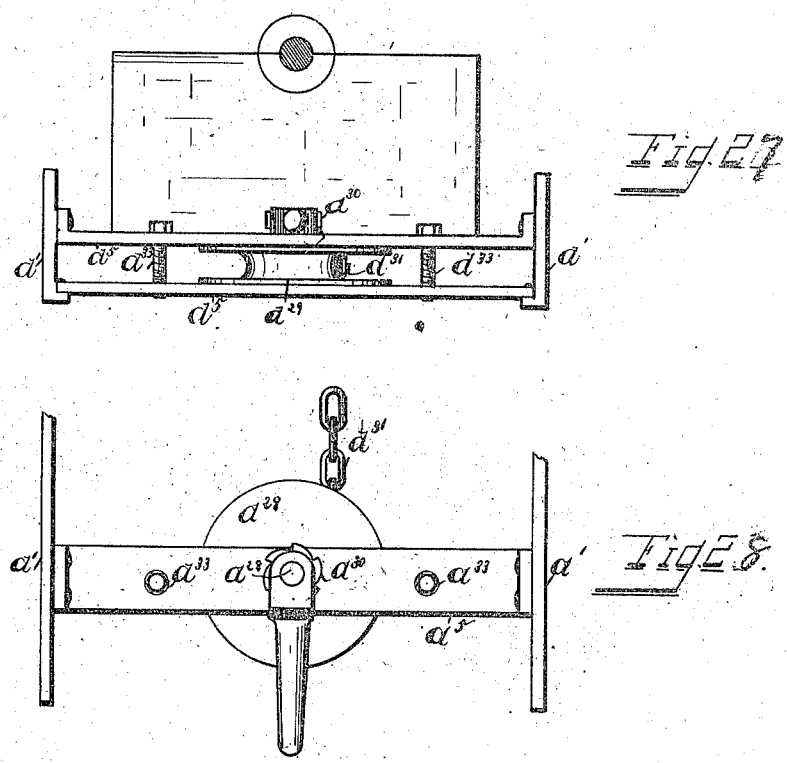

In the accompanying drawings, Figure 1 is a detailed plan view of the rear portion of my machine, showing the operating mechanism and engine connection therewith, also the main frame and supporting-screws with trailing wheel in position. Fig. 2 is a plan view of the remaining portion of the main frame and cutter-arms with a section of the track and the carriage on which the machine is supported while in operation; Fig. 3, a longitudinal vertical section on the line 3 3 of Fig. 1, the swinging plate carrying the feeding mechanism being turned at right angles to the position shown in Fig. 1. Fig. 4 is a longitudinal vertical section on the line 4 4 of Fig. 2. Fig. 5 is a sectional view on line 5 5 of Fig. 1. Fig. 6 is a plan view of a section of track and the carriage. Fig. 7 is a longitudinal sectional view of the track, showing the ends of two sections brought together. Fig. 8 is a cross-section of the track and connecting-plate. Fig. 9 is a side view of the feeding mechanism, showing gear-wheels arranged for slow speed. Fig. 10 is a side view of the same with gear-wheels transposed for a more rapid speed. Fig. 11 is a side elevation of the forward portion of the main frame with end view of the carriage and a section of track, showing device for connecting the main frame to the carriage and for changing the angular position of the main frame relatively to the track. Fig. 12 is a side view of the same portion of the main frame, representing the carriage-connecting device in position for transportation about the mine. Fig. 13 is a side elevation of a broken-off section of the main frame with the rear portion turned up. Fig. 14 is a view of a portion of the cutter-chain, showing one cutter-link with holder and cutters in position. Fig. 15 is a side elevation of the same with a section of the shoe or guide forming part of the cutter-arm. Fig. 16 shows a longitudinal section of a cutter-link and shoe with the pintles for holding the shoe in place and for connecting other links to it. Fig. 17 is a perspective view of a single-cutter holder and cutters. Fig. 18 is a perspective view of the pin used for securing the cutter-holders in the links. Fig. 19 is a plan view of the trailing wheel used for supporting the rear part of the machine during the operation of cutting. Fig. 20 is a side view of the same, showing a section of the main frame and broken-off parts of the adjusting-screws. Fig. 21 is a perspective view of the screw-eye used as a fastening for the feed-chain in the rib or pillar of coal. Fig. 22 is a vertical section of the same and of the wedge or key used for clamping the screw in the well. Fig. 23 is a cross-section of the same through line x x of Fig. 21. Fig. 24 is a diagrammatic plan of a mine room or gallery, showing the machine in position for cutting and the changes at successive stages of the operation; Fig. 25, a conventional view of the feed mechanism with the feed-chain; Fig. 26, a plan view of the essential parts in an organized position; Fig. 27, a partial end view of the machine, and Fig. 28 a plan of the same.

In the drawings, A represents the main frame of the machine, which is made in two sections A' and A², consisting, respectively, of longitudinal bars $a'$ and $a^2$, connected by transverse bars $a$, X-shaped braces $a^3$, a transverse arched bar $a^4$ at the forward end, and parallel transverse bars $a^5$ at the rear end. This construction makes a strong and rigid frame and is continued throughout the entire length. The object in constructing the main frame in sections is to provide a frame which is long enough to permit the cutter-driving mechanism to travel longitudinally thereon for the purpose of end cutting, but which may be shortened to enable the machine to avoid posts or other obstructions when used for side cutting. This is important, since in many mines the roof is insecure and must be supported by frequent posts or pillars for the safety of the workmen. The bars $a'$ and $a^2$, constituting the longitudinal frame-pieces of the main frame, are provided at their respective opposite ends with tongues $a^6$ and recesses $a^7$. Upon the outside of longitudinal bar $a^2$ is secured a steel plate $a^8$, having a recess $a^9$ in its projecting end, and upon the outside of section A is secured a steel plate $a^{10}$, having a tongue $a^{11}$. In plate $a^8$ is a round hole, and through side piece $a'$ is an oval hole $a^{13}$, and taking through both of these holes is a bolt $a^{12}$, having on one end a head adapted to prevent turning and on the other end a clamping-nut $a^{14}$. This construction applies to the parts constituting both sides of the frame. In Fig. 13 the section A' is shown turned up and supported by the bolt $a^{12}$, which also clamps it and holds it in its position. To bring the sections of the frame into horizontal alinement, the nut $a^{14}$ is loosened and the section A' brought down, the slot $a^{13}$ permitting it to be drawn backward sufficiently to permit the tongues $a^6$ and $a^{11}$ to clear the walls of the recesses $a^7$ and $a^9$. The sections are then moved together and the nut $a^{14}$ tightened, the tongues $a^6$ and $a^{11}$ taking, respectively, into the recesses $a^7$ and $a^9$. This makes a rigid continuous frame of sufficient length for working to the best advantage, but which may easily be shortened when necessary.

The bars constituting the side pieces of the frame are preferably of steel and of the form of rolled steel known as "bulb-angle." The bulb is planed square, as shown at $a^{15}$, Fig. 5, and forms tracks or guides upon which the operating mechanism may be moved upon the frame longitudinally. The flanges $a^{16}$ upon the lower inner side of the frame-pieces afford a convenient point of attachment for the transverse bars $a$ and braces $a^3$, the ends of which are securely riveted thereto.

B is the motor-frame, carrying a forwardly-extending part C and a cutter-arm D. In the sides of the motor-frame are channels $b$, in which fit the guides $a^{15}$ of the main frame. The motor-frame may be moved longitudinally along these guides a distance equal to the available length of the cutter-arm. Supported in suitable bearings $b'$ in the motor-frame is the motor armature-shaft $b^2$, carrying pinion $b^3$, which meshes in a bevel-wheel $c$. Any preferred type of motor may be used, but I prefer an electric motor of the kind shown in section in Fig. 5, in which $b^4$ represents the armature, $b^5$ the poles, $b^6$ the side pieces of the frames, and $b^7$ the field-poles. These poles extend well down over the sides of the armature, the iron of which is consequently more directly magnetized by the magnetic lines of force from the coils $b^7$. The motor is also very compact, which is a very desirable feature for mining-work. The winding of the field and armature coil is in series, and a suitable rheostat $b^8$ is provided for starting purposes. The forwardly-projecting part C is secured to the motor-frame proper by screws $c'$ and is provided with a boss $c^2$, which carries a bushing $c^3$, in which is mounted the extended hub $c'$ of the bevel-wheel $c$, to which a vertical shaft $c^5$ is secured. By this method of construction I economize space and at the same time secure great strength at the point of union between shaft $c^5$ and bevel-wheel $c$ and a generous wearing-surface between the hub of the wheel and bushing $c^3$, which constitute the principal bearing of the device. The bearing for the upper end of the vertical shaft $c^5$ is provided in a plate or arm $c^6$, extending from the top of the motor-frame B, and bored at $c^7$ to receive the shaft.

The extension C of the secondary frame is constructed with upwardly-extending front and side pieces $c^8$ and $c^9$, the sides extending back and lapping the motor-frame B a sufficient distance to permit them to be secured thereto and with the cover $c^{10}$ forming a chamber inclosing the bevel-pinion $b^3$ and bevel-wheel $c$ and protecting them from flying particles of coal or dirt.

Near the upper end of vertical shaft $c^5$ is worm $c^{11}$, and immediately below it is a clutch $c^{12}$. The worm is loosely fitted on the shaft and is free to turn in a horizontal plane, but is prevented from movement longitudinally on the shaft by the bearing for the shaft on the upper end and a shoulder at its lower end on the shaft. The clutch is prevented from turning on the shaft, but has free movement longitudinally up or down the shaft a sufficient distance to release from engagement the clutch extensions on the opposing ends of the two parts. Around the outside of the body of the clutch near its center is turned a groove or channel $c^{13}$, in which take the inwardly-pointing and rounded extremities of a pivoted yoke-lever $c^{14}$. Attached to yoke-lever $c^{14}$ is a connecting-strap $c^{16}$, terminating at its upper extremity with an eye $c^{17}$, which embraces the hub of an eccentric $c^{18}$. This in turn is suitably mounted in bearings on the upper side of extension-plate $c^6$ and is provided with a lever $c^{19}$.

In Fig. 3 the clutch extensions are shown in engagement with those of worm $c^{11}$. To release them, the lever $c^{19}$ is turned forward, and acting through eccentric $c^{18}$, connecting-strap $c^{16}$, and yoke-lever $c^{14}$ causes the rounded extremities of the yoke to press against the lower side of the channel $c^{13}$ and by forcing the clutch downward to release its extensions from engagement with those of the worm. A reverse movement of the lever will cause them to reëngage and lock the worm against rotation on the shaft. On the lower extremity of vertical shaft $c^5$ is keyed a sprocket-wheel $c^{20}$, which may be further held by a nut $c^{21}$. This wheel or gear is used for driving the cutter-chain, as will be more fully described hereinafter.

To provide for feeding the secondary frame forward automatically as the cutters perform their operation at the commencement of a cut and also to feed the machine laterally along the track, I have provided a plate E, on which are the bearings for the required shafting and on which is placed all the necessary gearing for change of speeds. The plate E is placed over the lid or cover $c^{10}$ of the extension C of the motor-frame and is bored to take over a hub or boss $c^{22}$, encircling vertical shaft $c^5$. This plate, with the mechanism which it carries and which I am about to describe, has a capacity for movement about the shaft $c^5$ through an arc of ninety degrees, or thereabout, and is provided with means for locking it in any desired position relatively to the extension C. In the form shown plate E is provided with a curved slot $e$, through which takes a stem $c^{23}$, having at its lower end a screw-threaded portion adapted to take into a corresponding thread in a boss or projection $c^{24}$ on the forward end of extension C. This stem has an annular shoulder $c^{25}$, adapted to engage with the plate E, and a hand-wheel $c^{26}$. By rotating the stem $c^{23}$ until the shoulder $c^{25}$ engages plate E the latter may be clamped at any desired point in the arc. By releasing the clamping-screw the plate may be swung to any other position in the arc without disturbing the relative positions of the mechanism mounted thereon. This arrangement of parts is provided to permit the same feeding mechanism to be used for feeding in different directions. Mounted in suitable bearings upon plate E is a shaft $e'$, upon which between its bearings is keyed a worm-wheel $e^2$, adapted to mesh with worm $c^{11}$, and upon the end of which is a pinion $e^3$. Upon another shaft $e^4$, also mounted in bearings carried by plate E and keyed between the bearings, is a sprocket-wheel $e^5$, and upon the end of the shaft $e^4$ is a gear-wheel $e^6$. An intermediate gear-wheel $e^7$, adapted to mesh with wheels $e^3$ and $e^6$, is carried by an arm or lever $e^8$, loosely secured to the shaft $e'$. The free end of the lever $e^8$ takes between the parts $e^{10}$ of a bifurcated standard $e^9$. Each of the parts $e^{10}$ has a curved slot $e^{11}$, adapted to receive a clamping-bolt $e^{12}$, taking through the arm $e^8$, and by which the latter may be clamped in any desired position relatively to the standard. The clamping-bolt is provided with a combined nut and handle $e^{13}$, by which it may be speedily actuated. By releasing the bolt the arm $e$ may be raised and the intermediate gear $e^7$ disengaged. This affords a convenient and speedy means for relieving the sprocket-wheel $e^5$ from strain and for adjusting the feed-chain.

For feeding or drawing the device I use a sprocket-chain I, made of steel and having hooks at the ends, with which to grab the links of other chains used as extensions. The chain is operated by being placed on the under side of sprocket-wheel $e^5$ between the bearing-standards, and is held up to the teeth by a raised part or guide $e$ on plate E. When the full length of the chain has been used in feeding, the sprocket-wheel $e^5$ is released from strain and the chain drawn back and rehooked in the extension-chain for use again.

This relates to the lateral feed more especially, and is repeated until the kerf is completed.

In the operation of cutting coal or other similar substances a variation of the feed movement independent of the speed of the cutting mechanism is essential to secure the best and most economical results. This is accomplished on my machine by changing the gear-wheels $e^3$ and $e^6$ or substituting other sizes for them. This is easily accomplished, since they are both on the end of their respective shafts outside of the bearing and are loosely fitted with a feather to prevent turning. In Fig. 10 a change of sizes and also a change of the intermediate gear is shown. The latter is not necessary, but may be done, and is provided for by mounting the intermediate gear-wheel adjustably in the arm $e^8$. In the form shown the arm $e^8$ has a slot $e^{14}$, serving as a bearing for the shaft $e^{15}$, upon which the intermediate wheel is mounted. The shaft $e^{15}$ is screw-threaded at its ends and provided with nuts $e^{16}$, by which it may be clamped in the desired position.

To provide for my machine a strong yet light and rigid extension or cutter-arm, I make use of the following construction.

The frame of the cutter-arm is securely fastened to the extension C and consists of longitudinal bars $d$ and $d'$—two on each side—superimposed and parallel, but connected by transverse bars $d^2$. Along the sides of this frame and bent circularly around the forward extremity is the band or shoe $d^3$. This is preferably of steel and extends backward along the sides of frame D nearly to the point of union with the extension C. Along the side portions of shoe $d^3$ at suitable intervals are drilled holes to receive the right and left hand threaded rods or bolts $d^4$. These rods or bolts are provided with square heads, and the holes in shoe $d^3$ are countersunk to receive them to a depth slightly greater than their thickness. They pass between the longitudinal bars $d$ and $d'$ and through the spaces between the transverse bars $d^2$ and are united by the right-and-left-threaded connectors $d^5$. Through the forward transverse bar $d^2$ is drilled and tapped a hole for the reception of an expansion-bolt $d^6$, which is provided with a round shank $d^7$, a shoulder $d^8$, a flat-sided part $d^9$ for convenience in turning, and a lock-nut $d^{10}$.

Fixed centrally upon the inner side of the circular portion of shoe $d^3$ to reinforce it is an expansion head or bar $d^{11}$. In the expansion-head $d^{11}$ is a hole adapted to receive shank $d^7$ of expansion-bolt $d^6$. The object of this construction is to provide a convenient means for adjusting the reach of cutter-arm D to the requirements of the cutter-chain and a ready way to remove the latter without taking it apart. The friction of the cutter-chain against the shoe $d^3$ during the operation of cutting is considerable and produces wear which in time will compel the renewal of that part, and in order to do this in the quickest and least expensive manner the shoe is made removable. To remove the shoe, the bolts $d^4$ are turned out of connectors $d^5$ and removed, and the shoe is drawn forward to release it from the shank of expansion-bolt $d^6$. To lengthen the cutter-arm and tighten the cutter-chain, the bolts $d^4$ are turned out of connectors $d^5$ until loose, and expansion-bolt $d^6$ is turned out, pressing against the expansion-head $d^{11}$ and forcing the shoe $d^3$ forward. The expansion-screw is held from displacement by lock-nut $d^{10}$, and the shoe is clamped to the side of the frame D by tightening the connectors $d^5$. The bolts $d^4$, being between the side pieces $d$ and $d'$, have ample longitudinal movement, but are securely held vertically.

F represents the cutter-chain; $f$, the cutter-links; $f'$, connecting-straps forming the sides of intermediate or connecting links; $f^2$, pintles for joining the cutter-links and the straps constituting the intermediate links; $f^3$, a shoe detachably secured to the cutter-links; $f^4$, a cutter shank or holder; $f^5$, cutters carried thereby, and $f^6$ a pin of novel construction for holding the cutter-shanks in their sockets. The cutter-link $f$ has an elongated longitudinal opening $f^7$ and transverse holes $f^8$. The shoe $f^3$ has a width equal to that of the cutter-link and is provided with projections $f^9$, adapted to take into the opening $f^7$ in the cutter-links. Upon the outer face of each of these projections is formed a recess $f^{10}$, conforming to the curve of the pintles. A segment corresponding to the recesses $f^{10}$ is removed from the portion of the pintle which comes opposite the opening $f^7$, leaving a flat face $f^{11}$. By turning a pintle to such a position that its flat face will be parallel with the path of the projections $f^9$ the shoe can be inserted. I prefer to rivet the pintles tightly to the connecting-straps and to arrange them with their flat faces in substantially the position relatively to the other parts shown in Fig. 16. When so arranged, the shoes will be held in place when the portion of the chain which they occupy is straight or bent inward—that is, when in any position which they may occupy in the normal operation of the chain—but they may be released by bending the chain outward until the flat face of the pintle registers with the recesses in the shoe. The connecting-straps have on one side a projection $f^{12}$, the projections on the opposite sides embracing the shoe $d^3$ of the cutter-arm, a portion of which is shown in Fig. 15. I prefer to make the connecting-straps of the cutter-links of rolled steel, the cutter-links of steel forgings finished in dies, and the shoes of bronze alloy.

In operating a machine of this character it is desirable to keep the cutting points or tools sharp and also to have them uniform in length; otherwise those which are longest will do the most work and soon become dulled and ineffective. To keep a tool sharp any length of time cutting in such substances as sulfur-coal or fire-clay, it must be very hard, which is impracticable unless sufficient metal is provided in the body of the tool to withstand the shocks and prevent breakage. The tools ordinarily used for this character of work have their points and shanks combined in one piece of steel, and the frequent forgings and grindings soon produce uneven sets and bad work is the result. Moreover, the shank, which is the most expensive part of the tool, soon becomes worn out and useless and is thrown away, adding greatly to the cost of operating. To obviate these objections, I provide the removable cutter-shank $f^4$ and the cutters $f^5$. The cutter-shank is preferably made of fine steel and has at its outer end curved depressions $f^{13}$, affording seats for the cutters, which may be secured to the shank by rivets $f^{14}$ or in other suitable manner. The cutters are preferably provided with two or more cutting-faces $f^{15}$, the extremities of which are equidistant from the center of the cutter-blank. From these extremities rearward the diameter of the blank is gradually reduced, thereby making clearance for the points when cutting. Near the edge of the depressions in which the cutters are seated the holders are provided with transverse holes through which take pins $f^{16}$, adapted to engage with the rear of the cutter-points and hold them against rearward movement. A cutting-face may be used until dull, when by removing the pin another face may be brought into cutting position. This is continued until all are dull, when the holder is removed and another substituted. The cutters are preferably removed from the holders for grinding. For securely holding and quickly removing the shanks or holders I provide the pin $f^6$, adapted to take through the transverse holes $f^8$ in the cutter-links and a corresponding hole $f^{17}$ in the cutter-shank. This pin has at one end a head $f^{18}$ and carries at the other end a pendant $f^{19}$, having an eye of such size that when turned in line with the pin it may be drawn through the holes $f^8$ and $f^{17}$. The pendant is of such length that when the cutter is in operation the pendant will be held by the wall of the kerf from attaining a position in line with the body of the pin or any position in which the pin may escape. To facilitate moving the machine laterally across the gallery, I provide a track H and a carriage K, adapted to travel thereon and upon which the main frame is mounted. The track H preferably consists of steel bars $h$ of the form known as "channel-bars." These bars may be joined in any suitable manner; but I prefer to use connecting-plates $h'$, having a width equal to the channel of the track and extending longitudinally some distance in each section of the track. These plates are provided with apertures adapted to take over upwardly-projecting studs $h^2$ in the track. It will be seen that it is only necessary to drop the connecting-plate over the studs in two track-sections to hold them securely together, the connecting-plate by its engagement with the channel-walls holding the track against transverse strain. On the under surface of the track and bolted or otherwise secured thereto are transverse plates $h^3$, carrying downwardly-extending points or spurs $h^4$. When the weight of the apparatus is brought to bear upon any part of the track, the spurs sink into the floor, which is usually of slate or fire-clay, and prevent displacement from side strain or other causes. The spurs are preferably made removable, in order that they may be removed for sharpening or to be replaced by others. The carriage K consists of two longitudinal bars $k$, joined by a series of pintles $k'$, placed at regular intervals throughout the length of the bars and having reduced ends, against the shoulders of which the bars $k$ are riveted. Near the ends of the bars $k$ are holes to receive axles or shafts $k^2$. Upon the ends of these axles are flanged wheels or rollers $k^3$, so mounted that the flanges of each pair will fit snugly between the sides of the track. The carriage should extend beyond the sides of the main frame (which is mounted transversely thereon) to afford a suitable length of wheel-base and more effectually resist the radial or side strain of the apparatus on the track while in operation. The pintles, in addition to their connecting functions, may be used in moving the main frame longitudinally upon the carriage, for a purpose to be mentioned hereinafter.

To support and adjust the elevation of the rear part of the main frame, I employ a trailing device N. Upon the outside of the main frame are secured screw-blocks $n$, through which take adjusting-screws $n'$, having reduced ends. Extending transversely of the machine are two parallel bars $n^2$, between which midway of their length a wheel $n^3$ is mounted upon a suitable axle. These bars are separated at their ends by the tongues $n^4$ of bands $n^5$, adapted to receive the reduced ends of the adjusting-screw $n'$. The bands $n^5$ are preferably secured to the transverse bars $n^2$ by rivets $n^6$ or by some other means which will permit of a hinge movement, thus permitting either adjusting-screw to be turned independently. The lower ends of the adjusting-screws preferably terminate in points or spurs $n^7$. In making end cuts it may be advisable to support the machine by the screws without using the trailing wheel. As the rooms or galleries are driven inward from the entries, it is essential that the ribs, which are the roof-supporting partitions between the galleries, should be kept straight along their sides and of uniform thickness. To accomplish this, the cutter-arm must at each extremity of a lateral cut reach substantially in line with the wall of the rib, which it does not do when occupying its normal position relatively to the guiding-rail. I accordingly provide means for swinging the main frame relatively to the carriage. Upon the sides of the main frame are studs $a^{17}$ and $a^{18}$ and clips $a^{19}$. Upon the stud $a^{17}$ is an eccentric $a^{20}$, adapted to receive a lever. In the form shown the eccentric is provided with a lever-socket $a^{21}$. On the hub of the eccentric $a^{20}$ is fixed the end of a connecting-strap $a^{22}$. This strap has on one side a lug $a^{23}$, adapted to take between the longitudinal bars of the carriage, and upon the other side a series of teeth $a^{24}$. On the stud $a^{18}$ is a lock-plate $a^{25}$, having on one side a recess $a^{26}$, adapted to interlock with the lug $a^{23}$, and upon the other side one or more recesses $a^{27}$, adapted to interlock with the teeth $a^{24}$ on the connecting-strap. In Fig. 11 the connecting-strap is shown in engagement with the carriage K, the projection $a^{23}$ being between the longitudinal bars $k\ k$ of the carriage and held from movement transversely to the track by the interlocking of the teeth of locking-plate $a^{25}$ with those on strap $a^{22}$, the clip $a^{19}$ serving to hold the free end of the strap to the frame. It is obvious that if a bar or lever is inserted in the socket of the eccentric and the lock-plate released by throwing the lever forward or backward a force will be exerted to move the main frame A transversely on the carriage K, since the strap, being in engagement with the carriage K, which is held by the track H, must act upon the main frame, which is free to move. If the lever on one side of the main frame is moved and the lever on the opposite side left stationary or moved in the opposite direction, (the construction of both parts being identical,) it is clear that an angular displacement between the carriage and the main frame must occur, which is the object sought for. By a reverse movement of the levers the angle is changed, and when they are brought to a corresponding position the angle made by the main frame and carriage is a right angle and is the normal position of the device while in operation. By thus swinging the main frame I am able to regulate the direction of the forward feed of my machine, so that when beginning a kerf and at the end of a lateral cut the rib-line may be kept intact without hand-picking.

When the machine is being moved from room to room, the parts of the connecting device are disposed as shown in Fig. 12. This is done by first raising the lock-plate $a^{25}$, then the connecting-strap, dropping the lock-plate on clip $a^{19}$, and then lowering the connecting-strap, so that its lug $a^{23}$ interlocks with the recess $a^{26}$ on the lock-plate.

Since the longitudinal movement of the secondary frame along the main frame A will be infrequent in practice, I have not thought it advisable to complicate the apparatus by making the return automatic, but provide instead a more simple device for that purpose, which has the further advantage of being quickly operated by hand. The construction is as follows, referring to Fig. 3: Through the transverse bars $a^5$ are holes which receive a vertical shaft $a^{28}$, upon which, between the bars, is securely keyed a flanged wheel $a^{29}$. On the top extremity of the shaft is keyed a toothed or ratchet wheel $a^{30}$. Fast to the hub of wheel $a^{29}$, between the flanges, is fastened one end of chain $a^{31}$, the other end being fastened to the under side of motor-frame B by an eye-plate $a^{32}$. This chain has sufficient length to permit the necessary longitudinal forward movement of the secondary frame when the machine is operating. To return the secondary frame to its first position, a suitable wrench or lever is fitted on ratchet-wheel $a^{30}$ and the chain wound up, the wheel being deep enough between the flanges to cause the turns of chain $a^{31}$ to superimpose on each other, and thus increase the speed in proportion as the cutter-arm is withdrawn from the kerf. That the chain $a^{31}$ may offer some resistance to the automatic forward feed of the secondary frame, to produce a steady motion, bolts $a^{33}$, Fig. 1, are placed vertically in holes through the transverse bars $a^5$, outside and close to the rim of wheel $a^{29}$, which may be used to clamp the bars $a^5$ on the hub of flanged wheel $a^{29}$, and thus produce friction. Friction-washers are placed between the ends of the hub and the transverse bars.

In Fig. 5 I have shown a preferred method of locking the motor-frame to the main frame at any desired point in its length. Clamps $b^9$ are held to the motor-frame by screws $b^{10}$, taking loosely through holes in the clamps. At the upper ends of the clamps are slots $b^{11}$, through which take the stems of hand-screws $b^{12}$, whose threaded ends take into the motor-frame. The screw-stems are provided with shoulders $b^{13}$, disposed between the clamps and the motor-frame. The lower ends of the clamps extend below and outside of the side pieces of the main frame. By turning the hand-screws outward the lower ends of the clamps are pressed against the sides of the main frame, the screws $b^{10}$ acting as fulcrums. By turning the hand-screws inward the motor-frame is released.

A matter of some importance in the operation of a machine of this character is a secure fastening for the chain or rope which draws it across the room or gallery. Since the cut must be made close to the rib at the finish of the cut, posts or screw-jacks between the roof and floor are not available. I have tried various devices and prefer the one shown in Figs. 21, 22, and 23. O is a screw, of rather large dimensions, having an inclined eye. The shank or body of the screw is cut with coarse V-shaped threads and flattened on one side $o'$ throughout its length, the eye being bent to an angle of about forty-five degrees from the flattened surface. P is a wedge or key adapted to be used in connection with the screw O. In operation a hole slightly smaller than the threads is drilled or bored in the rib at such an angle that when the screw is inserted its eye will stand from the rib at a right angle. The screw turned in, the sharp corners of the threads at the flattened surface cutting their way into the coal, the wedge is then driven in to hold it more securely. It is understood that the hole in the rib is made angular in any direction. This affords a secure holding for the chain or rope, which can be hooked to it without danger of pulling out.

I note here that each machine is provided with a truck or platform-car having wheels to fit the mine-tracks, on which it is mounted for movement about the mine.

Having described the mechanism of my device in detail, I will now describe the operation in general and the connection which various parts have with each other in performing the work.

Fig. 24 illustrates a mine floor or gallery with the track laid and the machine mounted on it at two points of the cut—viz., the commencement and the center. R is the room; $r$, the entrance to the room; $r'$, the ribs; $r^2$, break-troughs for air; $r^3$, posts to support the roof; $r^4$, the face or breast of coal to be cut, and S the entry. The machine having been brought into the gallery is mounted on the track and carriage and moved forward until the end of the main frame nearly touches the coal. The trailing device N is then put in position and the rear end of the main frame elevated by the screws $a'\ a'$. The frame is then moved longitudinally along the carriage K to the end nearest the rib and the whole machine moved along track H close to the rib. The main frame is thrown to an angle, as shown at the left in Fig. 24, by means of the eccentrics $a^{20}$ and connecting-straps $a^{22}$. It is now ready for the first operation, which is making the forward or longitudinal cut. This is done by placing the feed mechanism in the position shown in Fig. 1 and connecting the free end of the feed-chain I to the transverse bar $a^4$ at the front end of the main frame, a hole $a^{34}$ or equivalent means being provided for its attachment. The motor is then started, and the armature-shaft, acting through bevel-pinion $b^3$, bevel-wheel $c$, vertical shaft $c^5$, and sprocket-wheel $c^{20}$, drives the cutter-chain F around the cutter-bar D. The worm $c^{11}$ is engaged with clutch $c^{12}$ in the manner before described and intermediate gear-wheel $e^7$ thrown into mesh with wheel $e^6$, which causes the sprocket-wheel $e^5$ to revolve and, pulling on the feed-chain I, draw the motor-frame longitudinally forward on the main frame A. The cutters, operating on the coal, cut their way inward to the position shown by the dotted lines. The feed-clutch is then thrown out of engagement with the worm and the main frame turned on the track to a right angle. The motor is then stopped and the motor and main frames clamped together. The feed mechanism is swung upon plate E about ninety degrees and clamped in its new position. The feed-chain I is pulled through under the feed sprocket-wheel $e^5$ and connected directly or by means of other chains with the screw-eye O, which has been inserted in the opposite rib. The motor is again started, and the operation is as before, except that the feed mechanism draws the machine across the room along the track instead of longitudinally upon the main frame and the cut is lateral instead of longitudinal. If there are posts in the room to interfere with the free operation of the machine, the rear end of the main frame is turned up in the manner previously described and the motor started. This draws the device longitudinally on the track H and the cutters operating a kerf is made under the coal. At any point of the cut most convenient the motor is stopped and the carriage drawn through under the main frame A to the opposite end. This is best done with a bar against the main frame on the series of pintles $k'$, placed there for that purpose. After the machine has been drawn to the opposite rib the feed is stopped and the main frame turned on the track to bring the point of the cutter-arm in line with the rib and the cut completed, when the machine is loaded on the car to be moved to another room to repeat the operation. If at any part of the cut it is desired to inspect the cutter-arm or chain, the rear end of the main frame can be lowered and the cutter-arm withdrawn for that purpose. This is accomplished by use of flanged wheel $a^{29}$ and chain $a^{31}$ in the manner previously described.

It will be seen that my machine is simple in construction and effective in operation, that all the parts are easily accessible, and those subjected to much wear removable.

It is obvious that the details of construction and the arrangement of the several parts will admit of modifications without departing from the spirit of my invention. I do not therefore limit myself to the exact construction set forth; but

I claim as my invention—

1. The combination with the main frame of a mining-machine of a track; a carriage adapted to travel thereon and carrying the main frame; eccentrics mounted on the main frame; lock-plates also mounted on the main frame, and straps carried by the eccentrics and adapted to interlock with the carriage and the lock-plates, and means for actuating the eccentric.

2. The combination with the main frame A of a mining-machine of track H, carriage K adapted to travel thereon and carrying the main frame, eccentrics $a^{20}$ mounted on the main frame, lock-plates $a^{25}$ also mounted on the main frame, straps $a^{22}$ having lug $a^{23}$ and teeth $a^{24}$ adapted to interlock with corresponding recesses in the lock-plate, and means for actuating the eccentric, substantially as and for the purpose specified.

3. In a mining-machine, the combination of a main or supporting frame, consisting of sections provided with interlocking parts, means for locking the sections into alinement with each other, and a secondary frame, carrying the operating mechanism, substantially as and for the purpose specified.

4. In a mining-machine the combination of a main or supporting frame, consisting of sections hinged to each other, and provided with interlocking parts, means for locking the sections into alinement with each other, and a secondary frame carrying the operating mechanism, substantially as and for the purpose specified.

5. The combination, in a mining-machine, of a main frame, consisting of sections having interlocking parts, a bolt connecting the sections and serving as a hinge-pin, elongated bolt-openings in one of the sections, adapted to permit a limited sliding movement of one section relatively to the other when in alinement, substantially as and for the purpose specified.

6. The combination, in a mining-machine, of a supporting-frame, a secondary frame movable thereon, a base-plate pivotally mounted on the secondary frame, carrying the feeding mechanism, and means for locking the base-plate in different positions on the secondary frame, substantially as and for the purpose specified.

7. The combination, in a mining-machine, of a supporting-frame, a secondary frame movable thereon, a base-plate mounted on the secondary frame, automatic feeding mechanism carried by the base-plate, consisting of a train of gearing, a sprocket-wheel, a feed-chain, and devices for connecting and disconnecting the sprocket-wheel and the driving-shaft, and provisions whereby the base-plate and the mechanism carried thereby may be swung partially around the driving-shaft, substantially as and for the purpose specified.

8. The combination, in a mining-machine, of a supporting-frame, a secondary frame movable thereon, and carrying the operating mechanism, a base-plate mounted on the secondary frame, automatic feeding mechanism carried by the base-plate, consisting of a train of gearing, a sprocket-wheel, a feed-chain, one or more detachable gear-wheels for changing the speed of the feed-wheel, and provisions whereby the base-plate and the mechanism carried thereby may be swung partially around the shaft which drives the feed mechanism, substantially as and for the purpose specified.

9. The combination, in a mining-machine, of a supporting-frame, a secondary frame movable thereon, and carrying the operating mechanism, a base-plate mounted on the secondary frame, automatic feeding mechanism carried by the base-plate, consisting of a train of gearing, a sprocket-wheel, a feed-chain, devices for connecting and disconnecting the sprocket-wheel and the driving-shaft, one or more detachable gear-wheels for changing the speed of the feed-wheel, and provisions whereby the base-plate and the mechanism carried thereby may be swung partially around the shaft which drives the feed mechanism, substantially as and for the purpose specified.

10. The combination, in a mining-machine, of the supporting-frame A, the secondary frame B and the base-plate E, mounted upon the secondary frame and adapted to swing thereon, the shaft $c^5$, worm $c^{11}$ carried thereby, worm-wheel $e^2$, adapted to mesh therewith, the worm-wheel shaft $e'$, the lever $e^8$ mounted thereon, the slot $e^{14}$ in said lever, the shaft $e^{15}$ mounted thereon, the intermediate wheel $e^7$ carried thereby, the gear-wheel $e^6$ adapted to mesh therewith, the shaft $e^4$ carrying the said wheel, the sprocket-wheel $e^5$ mounted upon said shaft, and the feed-chain I, substantially as and for the purpose specified.

11. The combination with the main frame of a mining-machine of a supporting and adjusting device, consisting of adjusting-screws mounted in suitable blocks on the main frame, a cross-bar having at its ends seats for the lower ends of the adjusting-screws, and a wheel mounted upon an axle carried by the cross-bar, substantially as and for the purpose specified.

12. The combination with the main frame of a mining-machine of a supporting and adjusting device, consisting of adjusting-screws mounted in suitable blocks on the main frame, a cross-bar having at its ends hinged seats for the lower ends of the adjusting-screws, and a wheel mounted upon an axle carried by the cross-bar, substantially as and for the purpose specified.

13. Main frame A, screw-blocks $n$, adjusting-screws $n'$, having spurs $n^{11}$, the transverse bars $n^2$, the bands $n^5$, having a hinged connection with the transverse bars and serving as seats for the adjusting-screws, and the wheel $n^3$ carried by the transverse bars.

14. The combination, in a mining-machine, of a main frame, a secondary frame adapted to travel thereon and carrying the operating mechanism, parallel bars secured to the main frame, a flanged wheel mounted upon a shaft having its bearings in the parallel bars, a ratchet-wheel mounted upon said shaft, a chain connecting the flanged wheel and the secondary frame, means for actuating the ratchet-wheel, and means for clamping the bars upon the hub of the flanged wheel, substantially as and for the purpose specified.

15. The combination in a mining-machine of the main frame A, the secondary frame B movable thereon, the cutter extension or arm D carried thereby, the guide or shoe $d^3$, the bolts $d^4$, connectors $d^5$, extension-bolt $d^6$, the cutter-carrying chain F, and means for driving the cutter-carrying chain, substantially as and for the purpose specified.

16. The combination with a mining-machine of a cutter-chain having a series of links provided with detachable shoes, and a series of removable cutter-holders carried thereby, substantially as and for the purpose specified.

17. The combination with a mining-machine of a cutter-chain having a series of slotted links, detachable shoes having projections adapted to take into the slots, means for securing the shoe to the link and with the links forming sockets for the cutter-holders, and a series of detachable cutter-holders mounted thereon, substantially as and for the purpose specified.

18. The combination with a mining-machine of a cutter-chain having a series of links, detachable shoes having projections adapted to take into openings in the links, curved recesses in said projections, pintles having a curved face adapted to take into the recesses and lock the shoe in position, and a flat face adapted to register with the recesses, thereby permitting the withdrawal of the shoe, removable cutter-holder carried by the cutter-links, and means for locking the cutter-holder in position, substantially as and for the purpose specified.

19. The combination with a mining-machine of a cutter-chain, having a series of cutter-links $f$, having openings $f^7$, a series of connecting-links $f'$, a series of detachable shoes $f^3$, having projections $f^9$ adapted to take into the openings in the cutter-links and provided with recesses $f^{10}$, a series of pintles $f^2$, having flat faces $f^{11}$, a series of cutter-holders $f^4$, mounted in the cutter-links, and pins $f^6$ taking through the cutter links and holder, substantially as and for the purpose specified.

20. The combination with a mining-machine of a cutter-chain, a series of detachable cutter-holders carried thereby, a series of cutters, each having two or more cutting-faces rotatably mounted on the cutter-holders, and means for locking either cutting-face in operative position, substantially as and for the purpose specified.

21. The combination in a cutter-chain for mining-machines of a cutter-link having an opening adapted to receive a cutter-holder, a cutter-holder taking into the opening in the link and a pin taking through the link and holder, consisting of two rigid and loosely-connected parts, substantially as and for the purpose specified.

22. The combination with a mining-machine of a carriage K adapted to support the main frame, a section-track H, the connecting-plates $h'$ and studs $h^2$ for connecting the sections, the transverse plates $h^3$ and the spurs $h^4$, substantially as and for the purpose specified.

GEORGE F. CARD.

Witnesses:
GEO. LEONARD,
JAMES N. RAMSEY.